UNITED STATES PATENT OFFICE 2,540,885

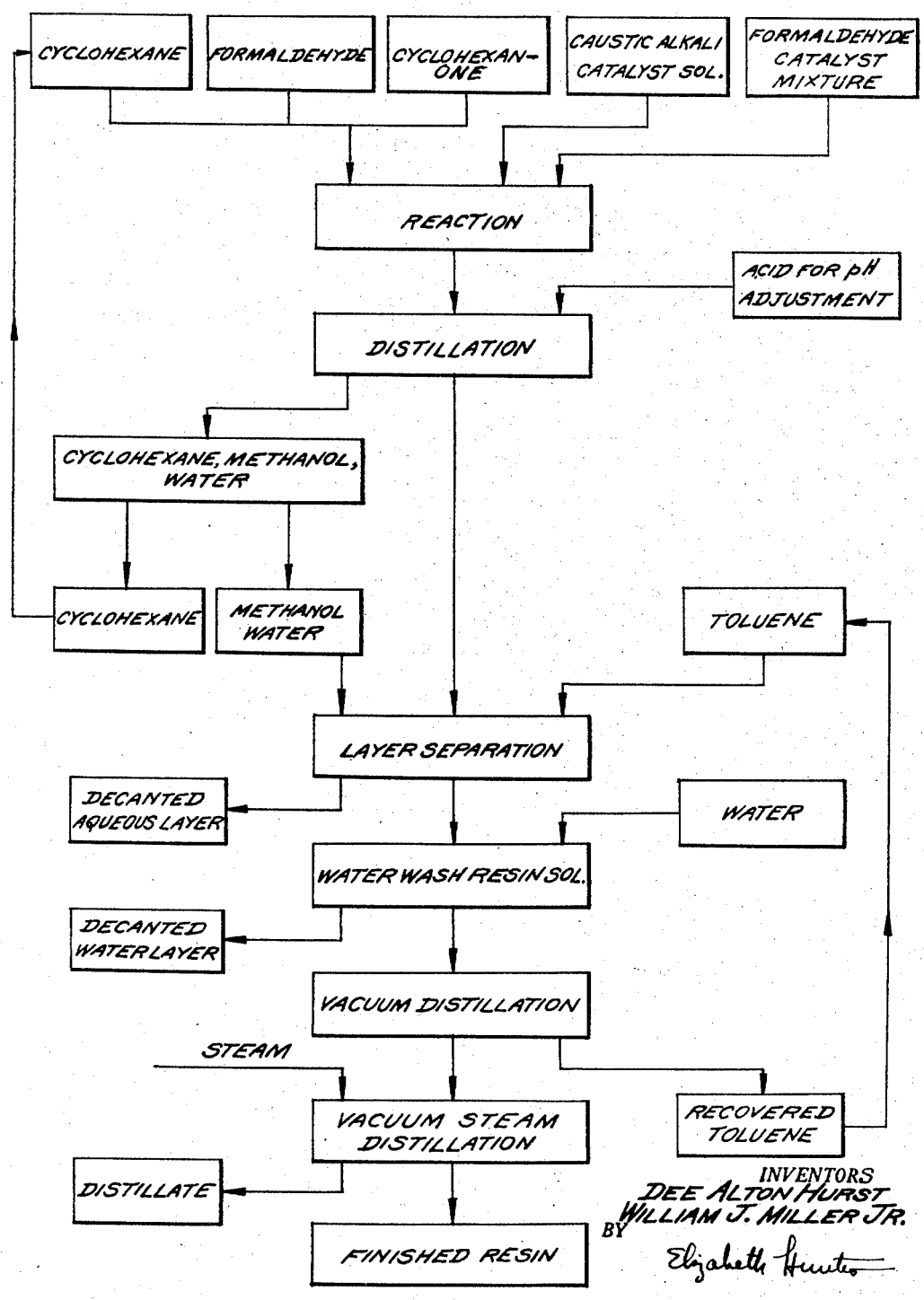

PROCESS OF PRODUCING CYCLOHEXANONE-FORMALDEHYDE RESINS

Dee Alton Hurst, Haddonfield, and William J. Miller, Jr., Matawan, N. J., assignors to Allied Chemical & Dye Corporation, New York, N. Y., a corporation of New York Application May 16, 1947, Serial No. 748,575

8 Claims. (Cl. 260—64)

This invention relates to resins and more particularly to an improved process for the production of resins from cyclohexanones and formaldehyde.

Cyclohexanone-formaldehyde resins possess various properties such as good color stability and compatibility with cellulose esters which render them particularly well suited for use in coating compositions containing cellulose esters, e. g., nitro-cellulose lacquers and varnishes, and for other purposes. Heretofore it has been proposed to manufacture the resins by reacting the cyclohexanone and formaldehyde in the presence of catalysts such as caustic alkali. The resins made by the prior art processes, however, are subject to the disadvantages that they are of yellow or dark color and frequently cloudy to an objectionable degree. These characteristics are recognized in the literature. For example, the work entitled "Synthetic Resins and Allied Plastics," by Barry et al., published 1937 by D. Van Nostrand Company, Inc., points out (page 385) that cyclohexanone-formaldehyde resins are "generally of a pale lemon color." These disadvantages seriously limit use of the resins, particularly in clear, light colored coating compositions. Furthermore, difficulty is encountered in carrying out the prior art processes to obtain high yields of readily reproducible resins of uniform properties.

It is an object of the invention to provide a novel process for the production of high yields of readily reproducible clear resins of lighter color than were heretofore obtainable by reaction of formaldehyde with cyclohexanone and its 3-methyl and 4-methyl homologs.

It is a further object of the invention to provide a process for the production of resins from formaldehyde and cyclohexanone and its 3-methyl and 4-methyl homologs which substantially reduces the amount of alkali metal formate formed by reaction of the caustic alkali catalyst and formic acid resulting from the Cannizzaro reaction on formaldehyde, with resultant improvement in the clarity of the resin.

It is another object of the invention to provide an improved process for recovery of cyclohexanone-formaldehyde resinous products of high clarity from reaction mixtures containing the resins. Other objects and advantages will appear hereinafter.

In accordance with the invention, cyclohexanone- and methylcyclohexanone-formaldehyde resins are produced by reacting cyclohexanone or a 3-methyl or 4-methyl homolog thereof with formaldehyde in a molar ratio of from 1:1.20 to 1:1.85 in the presence of a hydrocarbon capable of forming a water-containing azeotrope boiling within the range of 60° to 80° C., preferably 70° to 75° C., and .25 to 1 per cent of caustic alkali catalyst based on the weight of the cyclohexanone by the following procedure: (1) gradually and substantially continuously adding at least 50 per cent of the formaldehyde and 50 per cent of the catalyst simultaneously to the cyclohexanone or homolog thereof, (2) maintaining the pH value of the mixture within the range of 8 to 9 during at least the initial major portion of the reaction, (3) raising the temperature of the reaction mixture while adding the catalyst and formaldehyde from within the range of 50°–70° C. to within the range of 70°–80° C. and maintaining the temperature within the latter range until the reaction is substantially complete, and (4) controlling the hydrogen ion concentration of the reaction mixture so that its pH value is within the range of 6.5 to 7.5 before recovery of the resin from the mixture; preferably, a sufficient amount of an acidic reagent is added to the mixture after, or shortly before, the reaction is complete to reduce its pH value to about the neutral point 7. The hydrocarbons added to the reaction mixture may be of aliphatic, alicyclic or aromatic character, and preferably boil within the range of 70° to 85° C.; for example, cyclohexane, benzene, and aliphatic petroleum fractions capable of forming water-containing azeotropes boiling within the range of 60° to 80° C. may be utilized; the hydrocarbons are employed in amount of at least 10%, preferably from 20% to 30% based on the weight of the cyclohexanone.

The reaction mixture contains resin, water, hydrocarbon, methanol (introduced as a constituent of the aqueous formaldehyde employed and formed from the formaldehyde during the reaction), and alkali metal formate that is formed during the reaction. The invention comprehends an improved method of recovering clear, light-colored resin from the reaction mixture involving separating the hydrocarbon, water, and methanol therefrom, separating water-methanol layer from hydrocarbon and returning it to the resin, mixing the resinous residue with sufficient hydrocarbon solvent to dissolve the resin and reduce its viscosity materially, freeing the resin solution from the alkali metal formate, and then distilling off the hydrocarbon solvent from the resin, preferably under vacuum. The resinous residue may subsequently be freed of unreacted material by steam distillation under vacuum at a temperature not above 140° C.

In accordance with the above process, formation of alkali metal formate during the reaction is minimized, and since the formate promotes cloudiness of the resinous products, the invention facilitates obtainment of resins of high clarity. Furthermore, by carrying out the reaction in the presence of hydrocarbon material which forms water-containing azeotropes boiling within the range of 60° to 80° C., the temperature of the reaction mixture is readily maintained within the range promoting optimum yields of light-colored resins.

The accompanying drawing is a flow sheet illustrating one sequence of steps which may be employed in carrying out the invention.

In order to carry out the reaction at a satisfactory rate while avoiding formation of emulsions which would detrimentally affect recovery and clarity of the resin and also avoid objectionable darkening of the resin, it is important that the pH value of the reaction mixture be maintained above about 8 during the initial major portion of the reaction period and be reduced to about the neutral point before recovery of the resin from the mixture. The chief factors affecting the pH value of the reaction mixture are the amount of catalyst employed, the molar ratio of formaldehyde to the cyclohexanone, the reactivity of the formaldehyde, the manner in which the reactants are brought together, the temperature at which the reaction is carried out and the extent to which the catalyst and formic acid (which is formed from the formaldehyde) react to form alkali metal formate by the Cannizzaro reaction.

As the formaldehyde reactant, aqueous formaldehyde is employed, conventional commercial 37% formaldehyde solutions (which ordinarily contain some, e. g. 5% to 15% of methanol) being suitable. The concentration of the formaldehyde solution may be varied to any desired extent.

As the catalyst, caustic alkali such as sodium hydroxide or potassium hydroxide is employed. The catalyst may conveniently be utilized as solutions of from 10% to 50% caustic alkali concentration by weight in solvents such as water. As hereinabove disclosed, the amount of catalyst should be within the range of .25% to 1%, preferably 0.6% to 0.8% based on the weight of the cyclohexanone. Use of amounts of catalysts near the lower portion of this range, e. g., .25% to .36%, tends to produce softer resins than are obtained when larger amounts of catalysts, e. g., .6% to .8%, are employed. Use of less than .25% of catalyst seriously reduces the resin yield while use of more than 1% of catalyst results in resins of objectionably dark color. The molar ratio of formaldehyde to cyclohexanone should preferably be within the range of from 1.35:1 to 1.75:1.

The reactants are mixed by gradually and continuously adding a mixture of at least 50% of the formaldehyde and 50% of the catalyst to a mixture of the cyclohexanone and hydrocarbon. If desired, a mixture of all of the catalyst and all of the formaldehyde may be gradually added to a mixture of the cyclohexanone and hydrocarbon. Preferably, the reactants are brought together by first mixing not more than 50%, e. g. from 10% to 20%, of the formaldehyde with the cyclohexanone and hydrocarbon, heating the mixture to from 50° to 70° C., gradually adding sufficient catalyst to raise the pH value of the mixture to within the range of 8 to 9, e. g. 5% to 10% but not more than 50% of the catalyst, while agitating the mixture, and then gradually and continuously adding to the resultant mixture a mixture of the remainder of the formaldehyde and catalyst. The temperature of the cyclohexanone when the addition of catalyst is begun may be varied, depending on the reactivity of the formaldehyde. Thus, for example, a cyclohexanone temperature of about 60° C. is suitable, employing formaldehyde of high reactivity while, if formaldehyde of low reactivity is employed, the cyclohexanone may suitably be at a temperature of about 70° C.

The addition of the catalyst and formaldehyde to the cyclohexanone is preferably regulated so the temperature of the reaction mixture rises by the heat of the exothermic reaction to about 70° to 80° C. and is readily prevented from rising above this range by the volatility of the hydrocarbon which is distilled off and removes heat from the reaction mixture. The hydrocarbon is condensed, e. g., in a reflux condenser, and continuously returned as reflux to the reaction mixture. After the reaction becomes less vigorous, the temperature is maintained within the range of 70° to 80° C. by the application of external heat until the reaction is substantially complete.

Adjustment of the pH value of the reaction mixture to from 6.5 to 7.5 prior to recovery of the resin from the mixture is necessary for the production of light-colored resin. Relatively low reaction temperatures not exceeding 80° C. promote formation of high yields of light-colored resins provided the pH value of the reaction mixture is adjusted to about the neutral point before recovery of the resin from the mixture. However, such low reaction temperatures minimize neutralization of the caustic alkali catalyst by reaction with formic acid to form alkali metal formate in accordance with the formation of formic acid from formaldehyde by the Cannizzaro reaction and hence the pH value of the mixture ordinarily remains materially above 7 unless it is reduced by the addition of an acidic reagent. In order to secure the advantages of both the desired reaction temperature and pH value, we add to the reaction mixture an acidic reagent to bring the pH value of the mixture within the range of from 6.5 to 7.5. Such reagent should be added before recovery of the resin from the mixture and may appropriately be added when or shortly before the reaction is complete. As the acidic reagent, either organic or mineral acids, for example acetic acid, formic acid and orthophosphoric acid may be employed.

When the reaction is complete, the reaction mixture is ordinarily constituted principally of the resinous reaction product, hydrocarbon, water, alkali metal formate, the alcohol formed by the Cannizzaro reaction and present as a constituent of the formaldehyde, some unreacted cyclohexanone, and also some cyclohexanol if the cyclohexanol content of the cyclohexanone employed is substantial. Recovery of the resin by merely distilling off the volatile constituents of the reaction mixture results in cloudy resinous products of objectionably dark color. The lack of clarity is attributable to the presence of alkali metal formate formed by reaction of the catalyst with formic acid during the reaction. We have discovered that by distilling off from the reaction mixture having a pH value of from 6.5 to 7.5, preferably from 6.8 to 7.2, the water, hydrocarbon and alcohol, mixing the resinous residue with recovered water-methanol layer, with sufficient hydrocarbon solvent to reduce its viscosity materially, and with an equal volume of water, separating the water and alkali metal formate from the hydrocarbon solution of resin, and removing the solvent from the resin by distillation under vacuum, clear, light-colored resinous products may be consistently obtained. Instead of mixing the hydrocarbon solution of resin with water, the solution may be filtered, preferably in the presence of a suitable filter aid such as diatomaceous silica known as Celite or acid-treated and calcined clays, to aid in separating the alkali metal formate. A preferred procedure for recovery of the resin from the reaction mixture involves the following steps: (1) distilling off from the reaction mixture having a pH value of from 6.8 to 7.2 the hydrocarbon, alcohol and water; these distill off at temperatures materially below the boiling point of water, (2) permitting the distillate to stratify and mixing the aqueous layer containing the methanol with the resinous residue, (3) adding from 15% to 20% by weight of hydrocarbon solvent based on the weight of the resinous residue to the resin-containing mixture, (4) separating the aqueous portion of the mixture from the resin solution mechanically, e. g., by decantation, siphoning or centrifuging, (5) mixing the resin solution with from 100% to 150% of water based on the volume of the solution and then separating this water from the solution mechanically, and (6) vacuum distilling the resin solution under pressure of from 25 to 100 mm. of mercury to remove the hydrocarbon solvent. The resinous residue may then be steam distilled under vacuum at a temperature not above 140° C. to remove unreacted material. The hydrocarbon solvent employed in the recovery of the resin from the reaction mixture should boil within the range of 80° to 140° C., preferably below 130° C., and may be of aromatic or non-aromatic character. Examples of preferred hydrocarbons are toluol and benzol. By operating in this manner, readily reproducible, clear, light-colored resins of a melting point of from 100° to 120° C. are consistently obtainable.

The following examples are further illustrative of the invention:

*Example 1*

The materials used were 1,000 parts by weight of cyclohexanone of 99% purity, 200 parts by weight of cyclohexane, sufficient aqueous formaldehyde solution containing 37% of formaldehyde of relatively high reactivity to provide a formaldehyde:cyclohexanone molar ratio of 1.6:1 and sufficient 20% solution of sodium hydroxide catalyst to provide 0.8% of the catalyst based on the weight of the cyclohexanone. The cyclohexanone, cyclohexane and 25% of the formaldehyde were mixed and heated in a reaction vessel equipped with a reflux condenser to a temperature of 60° C. and 9% of the catalyst was divided into three equal portions and these portions were added to the mixture at one minute intervals. The temperature of the mixture in the reaction vessel rose to 70° to 75° C. and refluxing of the mixture began. The remainder of the formaldehyde and catalyst were mixed and addition of this mixture to the reaction vessel was begun three minutes after the first addition of catalyst. The formaldehyde-catalyst mixture was added continuously at a gradually increasing rate sufficient to maintain vigorous reaction and refluxing of the reaction mixture. Seven minutes were required to add the remainder of the formaldehyde and catalyst. After addition of all of the formaldehyde and catalyst, the reaction vessel was heated to maintain steady refluxing of its contents at a temperature of 68° to 73° C. for between 40 and 50 minutes. When the reaction was complete, the pH value of the reaction mixture was 8 and a sufficient amount of a 5% aqueous solution of acetic acid was added to reduce the pH value to about the neutral point.

The resin was recovered from the reaction mixture by distilling it until the still charge reached a temperature of 90° C. at which time the cyclohexane, water and methanol had been distilled off as distillate. The distillate was stratified into a cyclohexane and an aqueous layer and the layers were separated; the cyclohexane may be employed for recovering a subsequent batch of resin. The aqueous layer was returned to the resin, 200 parts by weight of toluol were added and the mixture was thoroughly agitated at 80° C. At this point, it is advantageous to check the pH value of the mixture and adjust it to about 7 if it deviates materially from the neutral point. The mixture was allowed to stratify and the aqueous layer was separated from the toluol solution of resin by decantation. 1,000 parts by weight of water were than added to the resin solution, the mixture was thoroughly agitated and again allowed to stratify and the water layer removed. The resin solution was vacuum distilled under 30 mm. of mercury pressure until the still charge reached a temperature of 110° C. The hydrocarbon solvent may be recovered from any water driven off with the solvent by mechanical separation such as stratification and decantation. The resinous residue was subjected to vacuum steam distillation under 30 mm. of mercury pressure until the residue reached a temperature of about 135° C. and the resin was then poured in layers approximately ½ inch thick and permitted to harden. 1,260 parts by weight of clear, substantially colorless, resin of a melting point of 112° C. were obtained. The resin yield was about 1.26 parts by weight for each part of cyclohexanone utilized.

*Example 2*

Cyclohexanone (1,000 grams), formaldehyde (325 grams), and cyclohexane (250 grams) were heated to 70° C. and a mixture of 1000 grams formaldehyde with 29 ml. of 20% NaOH was added during a period of eight minutes. The formaldehyde was 37% solution. The resin was handled in a manner similar to that of the previous example. The water, methanol, and cyclohexane were distilled at atmospheric pressure from the resin layer until internal temperature of 95° C. was reached. Toluol was then added to the resin together with the water-methanol distillate mixture. Determination of the specific gravity of this water-methanol mixture by means of a pycnometer indicated the composition to be approximately equal parts water and methanol. The final resin was obtained in yield of 1245 grams with a melting point of 100° C. The resin was nearly colorless and clear.

The resin melting points given herein are determined by the cube-in-mercury method described in "Protective and Decorative Coatings," vol. 1, copyright 1941, by J. J. Matiello, pages 366–67, published by John A. Wiley & Sons, Inc., New York, New York.

We claim:

1. A process of producing resins comprising reacting formaldehyde with cyclohexanones of the group consisting of cyclohexanone and its 3- methyl and 4-methyl homologs in a molar ratio of from 1.20 to 1.85 mols of formaldehyde in aqueous solution to each mol of the cyclohexanone in the presence of at least about 10% based on the cyclohexanone of a hydrocarbon capable of forming a water-containing azeotrope which boils within the range of 60° to 80° C., and from .25% to 1% of caustic alkali catalyst based on the weight of the cyclohexanone, gradually and substantially continuously adding at least 50% of the catalyst and 50% of the formaldehyde simultaneously to the cyclohexanone in a manner such that the simultaneous addition of at least about the said proportions of formaldehyde and catalyst is the final addition of reactants to the reaction mixture, raising the temperature of the reaction mixture from within the range of 50° to 70° C. to within the range of 70° to 80° C. during the reaction controlling the pH value of the reaction mixture so that it is between 8 and 9 during at least the initial major portion of the reaction, and adjusting the pH value of the reaction mixture so that it is within the range of 6.5 to 7.5 before recovery of the resin from the reaction mixture, and recovering resin substantially free from alkali metal formate from the reaction mixture.

2. A process as defined in claim 1 in which the hydrocarbon is cyclohexane.

3. A process of producing resins comprising reacting aqueous formaldehyde with cyclohexanone of the group consisting of cyclohexanone and its 3-methyl and 4-methyl homologs in a molar ratio of from 1.20 to 1.85 mols of the formaldehyde in aqueous solution to each mol of the cyclohexanone in the presence of at least about 10% based on the cyclohexanone of a hydrocarbon boiling within the range of 70° to 85° C. and capable of forming a water-containing azeotrope which boils within the range of 70° C. to 75° C., and from .25 to 1 per cent of caustic alkali catalyst based on the weight of the cyclohexanone, mixing a portion, but not more than 50 per cent of the formaldehyde with the cyclohexanone and hydrocarbon at a temperature within the range of 50° to 70° C., adding to said mixture sufficient catalyst to raise the pH value of the mixture above 8, but not more than 50 per cent of the catalyst utilized, gradually and substantially continuously adding simultaneously to the resultant mixture the remainder of the formaldehyde and catalyst whereby the temperature of the reaction mixture rises to within the range of 70° to 80° C., controlling the pH value of the reaction mixture so that it is within the range of 8 to 9 during at least the initial major portion of the reaction and adding a sufficient amount of a reagent capable of substantially neutralizing the reaction mixture to reduce the pH value thereof to within the range of 6.5 to 7.5 before recovery of the resin from the reaction mixture, and recovering resin substantially free from alkali metal formate from the reaction mixture.

4. A process of producing resins comprising reacting formaldehyde with cyclohexanone in a molar ratio of from 1.20 to 1.85 mols of formaldehyde in aqueous solution to each mol of the cyclohexanone in the presence of from .25 to 1 per cent of caustic alkali catalyst and 10 to 30 per cent of cyclohexane based on the weight of the cyclohexanone, forming a heated mixture of the cyclohexanone and cyclohexane with a portion but not more than 50 per cent of the formaldehyde at a temperature within the range of 50° to 70° C., adding to the cyclohexanone-formaldehyde mixture sufficient catalyst to raise the pH value of the mixture to within the range of 8 to 9, gradually and substantially continuously adding to the resultant mixture while agitating a mixture of the remainder of the formaldehyde and catalyst, regulating the addition of the formaldehyde and catalyst so the temperature of the reaction mixture is raised by the heat of the reaction to within the range of 70° to 80° C., the volatility of the cyclohexane present in the reaction mixture preventing the temperature thereof rising substantially above 80° C., controlling the pH value of the reaction mixture so that it is within the range of 8 to 9 until said reaction is at least substantially complete and adding a sufficient amount of an acidic reagent to the mixture to reduce the pH value thereof to from 6.5 to 7.5 prior to recovery of resin from said mixture and recovering resin substantially free from alkali metal formate from the reaction mixture.

5. In a process of recovering a clear resin selected from the group consisting of cyclohexanone-formaldehyde and 3- and 4-methylcyclohexanone-formaldehyde resins from reaction mixtures containing the resin, alkali metal formate, at least about 10% based on the cyclohexanone of a hydrocarbon boiling within the range of 70° to 85° C. and capable of forming a water-containing azeotrope which boils within the range of 70° C. to 75° C., methanol and water, which reaction mixtures have a pH value within the range of 6.5 to 7.5, the steps which comprise distilling the reaction mixtures whereby the hydrocarbon, methanol, and water are removed therefrom as distillate, adding methanol, water and a sufficient amount of a hydrocarbon solvent to the resin to dissolve the resin and materially reduce its viscosity, mechanically separating the water and alkali metal formate from the resin solution and distilling off the hydrocarbon solvent from the resin whereby clear resin substantially free from alkali metal formate is obtained as residue.

6. In a process of recovering clear cyclohexanone-formaldehyde resins from reaction mixtures containing the resins, alkali metal formate, cyclohexane, methanol and water, which reaction mixtures have a pH value falling within the range of 6.5 to 7.5, the steps which comprise distilling the reaction mixture whereby the cyclohexane, methanol and water are removed therefrom as distillate at a temperature below the boiling point of water, separating the cyclohexane from the aqueous portion of the distillate containing methanol, mixing the aqueous portion of the distillate with the resin, adding to the resultant mixture from 15 to 20 per cent of toluol based on the weight of the resin whereby the resin is dissolved in the toluol and its viscosity is materially reduced, mechanically separating the water from the resin solution, mixing the resin solution with from 100 to 150 per cent of water based on the volume of the solution, mechanically separating this water from the resin solution, vacuum distilling the resin solution under pressure of from 25 to 100 mm. of mercury to separate the toluol therefrom, and steam distilling the resin under vacuum at a temperature below 140° C.

7. A process of producing resins comprising reacting formaldehyde with cyclohexanones of the group consisting of cyclohexanone and its 3-methyl and 4-methyl homologs in a molar ratio of from 1.20 to 1.85 mols of formaldehyde in aqueous solution to each mol of the cyclohexanone in the presence of at least about 10% based on the cyclohexanone of a hydrocarbon capable of forming a water-containing azeotrope which boils within the range of 60° to 80° C., and from .25% to 1% of caustic alkali catalyst based on the weight of the cyclohexanone, gradually and substantially continuously adding at least 50% of the catalyst and 50% of the formaldehyde simultaneously to the cyclohexanone, in a manner such that the simultaneous addition of at least about the said proportions of formaldehyde and catalyst is the final addition of reactants to the reaction mixture, raising the temperature of the reaction mixture from within the range of 50° to 70° C. to within the range of 70° to 80° C. during the reaction, controlling the pH value of the reaction mixture so that it is between 8 and 9 during at least the initial major portion of the reaction, and adjusting the pH value of the reaction mixture so that it is within the range of 6.5 to 7.5, distilling the reaction mixture whereby the hydrocarbon, methanol, and water are removed therefrom as distillate, adding methanol, water and a sufficient amount of a hydrocarbon solvent to the resin to dissolve the resin and materially reduce its viscosity, mechanically separating the water and alkali metal formate from the resin solution and distilling off the hydrocarbon solvent from the resin whereby clear resin free from alkali metal formate is obtained as a residue.

8. A process of producing resins comprising reacting formaldehyde with cyclohexanone of the group consisting of cyclohexanone and its 3-methyl and 4-methyl homologs in a molar ratio of from 1.20 to 1.85 mols of formaldehyde in aqueous solution to each mol of the cyclohexanone in the presence of at least about 10% based on the cyclohexanone of cyclohexane and from .25% to 1% of caustic alkali catalyst based on the weight of the cyclohexanone, gradually and substantially continuously adding at least 50% of the catalyst and 50% of the formaldehyde simultaneously to the cyclohexanone, in a manner such that the simultaneous addition of at least about the said proportions of formaldehyde and catalyst is the final addition of reactants to the reaction mixture, raising the temperature of the reaction mixture from within the range of 50° to 70° C. to within the range of 70° to 80° C. during the reaction, controlling the pH value of the reaction mixture so that it is between 8 and 9 during at least the initial major portion of the reaction, and adjusting the pH value of the reaction mixture so that it is within the range of 6.5 to 7.5, distilling the reaction mixture whereby cyclohexane, methanol and water are removed therefrom as distillate at a temperature below the boiling point of water, separating the cyclohexane from the aqueous portion of the distillate containing methanol, mixing the aqueous portion of the distillate with the resin, adding to the resultant mixture from 15 to 20 per cent of toluol based on the weight of the resin whereby the resin is dissolved in the toluol and its viscosity is materially reduced, mechanically separating the water from the resin solution, mixing the resin solution with from 100 to 150 per cent of water based on the volume of the solution, mechanically separating this water from the resin solution, vacuum distilling the resin solution under pressure of from 25 to 100 mm. of mercury to separate the toluol therefrom, and steam distilling the resin under vacuum at a temperature below 140° C.

DEE ALTON HURST.
WILLIAM J. MILLER, JR.

REFERENCES CITED

The following references are of record in the file of this patent:

UNITED STATES PATENTS

| Number | Name | Date |
|---|---|---|
| 2,059,943 | Graves | Nov. 3, 1936 |
| 2,191,802 | Novotny et al. | Feb. 27, 1940 |